United States Patent
Chou

(10) Patent No.: US 8,285,951 B2
(45) Date of Patent: Oct. 9, 2012

(54) CONTROL APPARATUS FOR CONTROLLING PERIPHERAL DEVICE, NON-VOLATILE STORAGE ELEMENT, AND METHOD THEREOF

(75) Inventor: Li-Ling Chou, Taipei County (TW)

(73) Assignees: Silicon Motion Inc., keji Chuangyeyuan, Tianan Digital, Futian, Shenzhen, Guangdong (CN); Silicon Motion Inc., Jhubei, Hsinchu County (TW)

( * ) Notice: Subject to any disclaimer, the term of this patent is extended or adjusted under 35 U.S.C. 154(b) by 635 days.

(21) Appl. No.: 12/485,044

(22) Filed: Jun. 16, 2009

(65) Prior Publication Data

US 2010/0138590 A1 Jun. 3, 2010

(30) Foreign Application Priority Data

Dec. 1, 2008 (TW) .............................. 97146583 A

(51) Int. Cl.
*G06F 13/00* (2006.01)
(52) U.S. Cl. ...................................................... 711/156
(58) Field of Classification Search ........................ None
See application file for complete search history.

(56) References Cited

U.S. PATENT DOCUMENTS

| | | | | |
|---|---|---|---|---|
| 5,761,536 | A * | 6/1998 | Franaszek | 710/68 |
| 7,634,587 | B2 * | 12/2009 | Ferguson et al. | 710/5 |
| 8,078,793 | B1 * | 12/2011 | Yakovlev | 711/103 |
| 2002/0161939 | A1 | 10/2002 | Kim | |
| 2006/0036776 | A1 | 2/2006 | Ferguson | |
| 2008/0019599 | A1 * | 1/2008 | Buckley | 382/240 |
| 2008/0256589 | A1 * | 10/2008 | Osaki | 725/131 |
| 2008/0259590 | A1 * | 10/2008 | De Goederen | 362/85 |

FOREIGN PATENT DOCUMENTS

| | | |
|---|---|---|
| CN | 1967504 A | 5/2007 |
| TW | 200707203 | 2/2007 |

\* cited by examiner

*Primary Examiner* — Duc Doan
(74) *Attorney, Agent, or Firm* — Winston Hsu; Scott Margo

(57) ABSTRACT

A control apparatus for controlling at least one peripheral device includes a non-volatile storage element and a controller. The non-volatile storage element is used for storing at least one control information set. The controller is externally coupled to the non-volatile storage element and includes a read-only storage element which stores a segment of program code. The controller loads the segment of program code to execute the segment of program code for reading at least one portion of the control information set from the non-volatile storage element to control the operation of the peripheral device.

16 Claims, 4 Drawing Sheets

CONTROL APPARATUS FOR CONTROLLING PERIPHERAL DEVICE, NON-VOLATILE STORAGE ELEMENT, AND METHOD THEREOF

BACKGROUND OF THE INVENTION

1. Field of the Invention

The present invention relates to a control mechanism for peripheral devices, and more particularly, to a control apparatus for controlling at least one peripheral device and a method thereof.

2. Description of the Prior Art

Please refer to FIG. 1. FIG. 1 is a diagram illustrating conventional control circuitry for peripheral devices. As shown in FIG. 1, the controller 100 controls two peripheral devices (i.e., a video sensor 110 and an audio codec circuit 115) through the bus 105, and the controller 100 writes/programs control information sets (e.g., driver program, specific configuration files, etc) related to control configurations of the video sensor 110 and the audio coded circuit 115 in the read-only memory 1001. In other words, designers of the controller 100 write/program control information sets related to different peripheral devices provided by different customers into the read-only memory 1001. However, if a new peripheral device is slightly different (e.g., a new peripheral device with a different model number), and therefore the corresponding control information set can not be supported by the read-only memory 1001, the conventional controller 100 will encounter a dilemma that the conventional controller 100 fails to support the new peripheral device. Generally, the conventional solution is that the designers develop another controller containing the corresponding information set to fulfill the requirement of the customers, which leads to a higher production cost.

SUMMARY OF THE INVENTION

Therefore, to solve the aforementioned problems, one objective of the present invention is to provide a control apparatus and a method thereof for storing related information sets according to flexible programming characteristics of a non-volatile storage element to thereby control at least one peripheral device.

According to an embodiment of the present invention, a control apparatus for controlling at least one peripheral device is disclosed. The control apparatus comprises a non-volatile storage element and a controller. The non-volatile storage element is for storing at least one information set of the peripheral device, and the controller, externally coupled to the non-volatile storage element, comprises at least one read-only storage element. The read-only storage element stores one segment of program code. The controller executes the segment of program code to read at least part of the control information set to control an operation of the peripheral device.

According to another embodiment of the present invention, a control method for controlling at least one peripheral device is disclosed. The control method includes following steps: storing at least one control information set of the peripheral device in a non-volatile storage element, which is externally coupled to a controller; storing a segment of program code in a read-only memory element in the controller; and executing the segment of the program code to read at least part of the control information set from the non-volatile storage element to control an operation of the peripheral device.

According to yet another embodiment of the present invention, a non-volatile storage element externally coupled to a controller is disclosed. The non-volatile storage element comprises at least one first section and a second section. The first and the second sections are for storing a first information set and a second information set, respectively. Each control information set comprises corresponding type information and different control information each having corresponding identification information. The controller reads specific control information within a control information set in the non-volatile storage element according to specific type information and specific identification information to control a peripheral device.

One advantage of the present invention is that with the flexible programming characteristic of a non-volatile element, the designers can easily modify control information sets or segments of program codes within the non-volatile storage element according to different customer requirements without a need for an extra design of a different controller. Therefore, the combination of the controller and the non-volatile storage element in one embodiment of the present invention can effectively support different types of peripheral devices.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
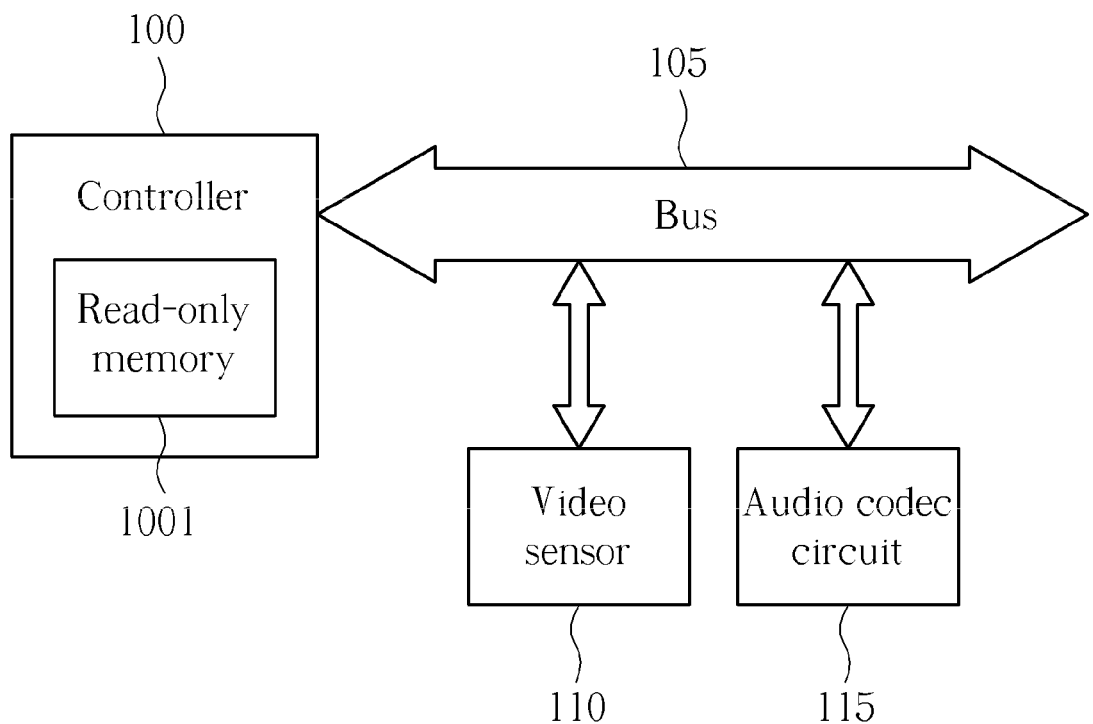
FIG. 1 is a diagram illustrating conventional control circuitry of peripheral devices.
Figure 2:
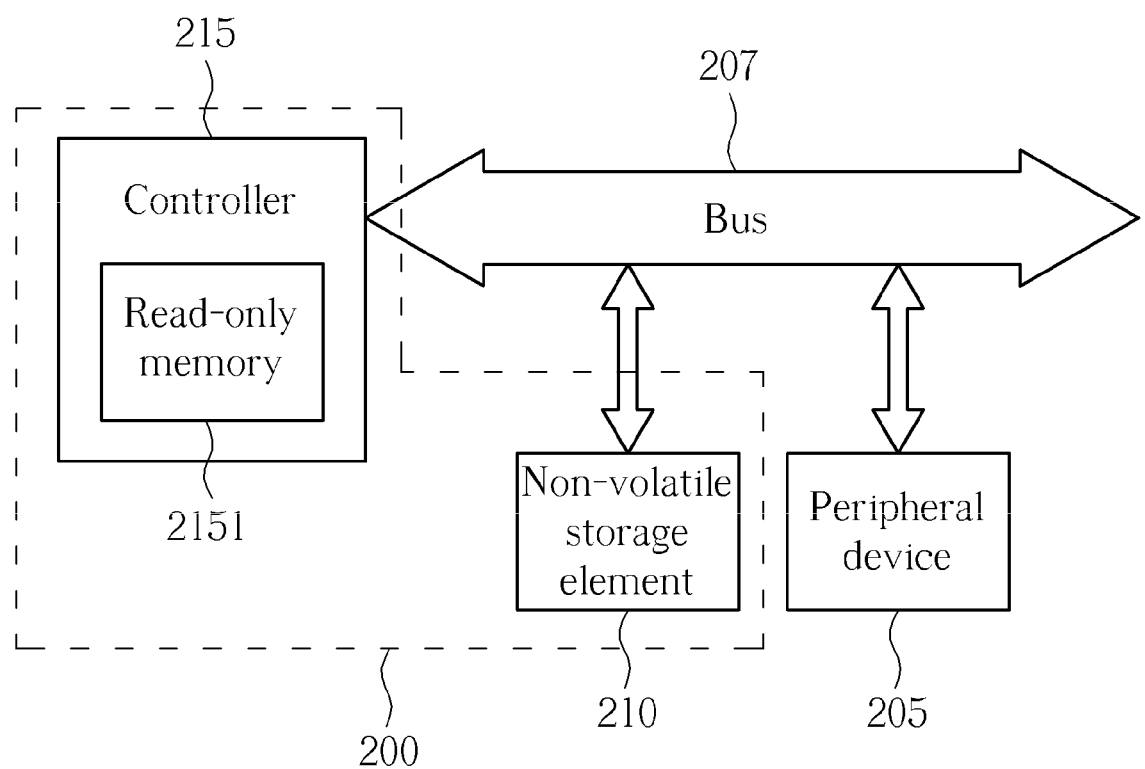
FIG. 2 is a diagram illustrating a control apparatus for controlling at least one peripheral device according to one embodiment of the present invention.

Please refer to FIG. 2. FIG. 2 is a diagram illustrating a control apparatus 200 for controlling at least one peripheral device 205 according to one embodiment of the present invention. For example, the peripheral device 205 could be a video sensor (e.g., an image sensor circuit) or an audio codec circuit. In this embodiment, the peripheral device 205 is a video sensor for explanation of the control method employed by the control apparatus 200 for controlling the peripheral device 205. However, this is not meant to be a limitation to the present invention. That is, the peripheral device 205 can be a circuit other than a video sensor or an audio codec circuit. The control apparatus 200 comprises a non-volatile storage element 210 and a controller 215. For example, the non-volatile storage element 210 can be implemented using an electrically erasable programmable read-only memory (EEPROM) for storing at least one control information set for controlling an operation of the peripheral device 205. The controller 215 is externally coupled to the no-volatile storage element 210 and comprises a read-only storage element 2151 (e.g., a read-only memory), which stores a segment of program code. Since the segment of program code and the control information set of the peripheral device 205 are stored in different storage elements, respectively. The controller 215 loads and executes the segment of program code for reading at least a part of the control information set or all of it from the non-volatile storage element 210 through the bus 207 to control the operation of the peripheral device 205 after the booted. In this embodiment, since the non-volatile storage element 210 is implemented by an EEPROM, the information data stored therein can be electrically erased and written. Therefore, an extra design of another controller is not required as just updating the control information set stored in the non-volatile storage element 210 can achieve the objective of controlling/supporting different peripheral devices. This facilitates the maintenance of the control apparatus 200. In other words, the peripheral device 205 in this embodiment can be video sensors produced by different manufacturers or video sensors of different model numbers, and the control apparatus 200 can fully support the peripheral device 205 by only updating the information data stored in the non-volatile storage element 210.

Figure 3:
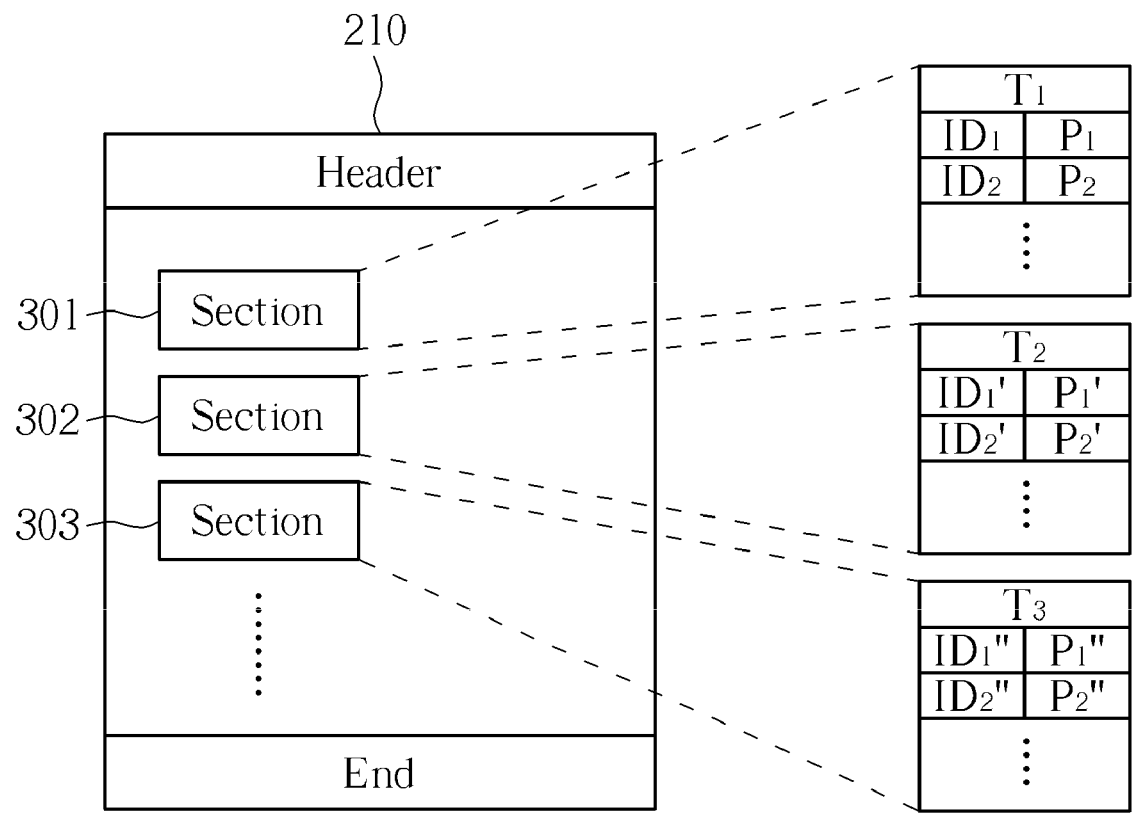
FIG. 3 is a diagram illustrating a format syntax of a plurality of sections storing a plurality of different control information sets in a non-volatile element shown in FIG. 2.

Please refer to FIG. 3. FIG. 3 is a diagram illustrating format syntax of sections storing different control information sets in the non-volatile element 210 shown in FIG. 2. Each control information set stored in each section contains a corresponding type information field, and further comprises a variety of different control information. Each control information has corresponding identification information. The type information indicates different kinds of control configurations, e.g., general batch file setting, property page setting, USB (universal serial bus) descriptor setting, MJPEG (Motion JPEG) video compression high-speed setting, etc. As shown in FIG. 3, sections 301-303 store control information sets which belong to control information of different control configurations. The controller 215 reads at least part of a control information set in a non-volatile storage element 210 according to an information structure of a look-up table stored in the controller 215, and then controls the operation of the peripheral device 205, wherein the information structure is generated from the controller 215 parsing a plurality of control information stored in the non-volatile storage element 210 when the controller 215 executes aforementioned segment of program code after being booted, and the information structure contains at least a specific type information and a specific identification information. Therefore, the controller 215 reads a part or all of a certain control information set corresponding to the specific type information from the non-volatile storage element 210 according to the specific type information, and further reads specific control information of the control information set according to the specific identification information to thereby control the operation of the peripheral device 205, wherein the specific control information corresponds to the specific identification information.

For example, the controller 215 can read control information $P_1$ in section 301 according to type information $T_1$ (e.g., 0x70 in practical) among all type information ($T_1, T_2, T_3$, etc) and identification information $ID_1$ (e.g., 0x08 in practical) among all identification information ($ID_1, ID_2, ID_3$, etc) of the specific type information $T_1$. In this embodiment, the section 301 is for storing control information sets of the general batch file setting. For example, the control information $P_1$ has data of a specific resolution (e.g., 640×480). With regard to control information sets of the general batch file setting, for example, control information of different resolutions (e.g., 160×120, 174×144, 320×240, 352÷288, 1280× 1024, 1024×768, 800×600, 640×480, etc), the controller 215 can utilize a resolution selected by users to read corresponding control information included in the general batch file setting to control the resolution of the peripheral device 205 (i.e., a video sensor). In another exemplary embodiment, the controller 215 reads control information $P_2$ according to specific type information $T_1$ and another specific identification information $ID_2$, wherein the control information $P_2$ has data of a resolution 1280×1024.

In addition, the controller 215 can read a control information $P_1'$ in the section 302 according to type information $T_2$ (e.g., 0x71 in practical implementation) and identification information $ID_1'$ (e.g., 0xb9 in practical implementation). In this embodiment, the section 302 is for storing control information sets of property page setting. For example, the control information $P_1'$ has data of brightness control, and the control information sets of the property page setting have control information of a default value, a maximum value, a minimum value, a singly-adjustable step size, etc. Regarding control information of brightness control, the controller 215 will display the corresponding default value, maximum value, minimum value, and singly-adjustable step size on a user interface to allow a user to make brightness adjustments after acquiring the control information of the brightness control. Once the user has made any brightness adjustments, the controller 215 can control brightness of a picture on a screen provided by the peripheral device 205 according to the user's adjustment.

Additionally, the controller 215 can read control information $P_1''$ in the section 303 according to type information $T_3$ (e.g., 0x72 in practical implementation) and identification information $ID_1''$ (e.g., 0xd2 in practical implementation). In this embodiment, the section 303 is for storing control information sets of USB descriptor setting. For example, the control information $P_1''$ has data of updating USB serial string, and the control information sets of USB descriptor setting have control information of updating USB serial string, variant control, single block/sub-block update and full block update. The controller 215 reads control information associated with the single block/sub-block update from the non-volatile storage element 210, and selects a single section in the non-volatile storage element 210 for modification/update according to the control information. Thus, loading/accessing all the sections is avoided. That is, the controller 215 selects and updates partial control information of the control information sets without loading/accessing all the control information. In this way, the efficiency and the flexibility of the controller 211 can be greatly enhanced. Concerning the aforementioned type information and identification information, they can be implemented using data patterns less frequently used to thereby achieve parsing error handling. In addition, it should be noted that the aforementioned control information can be a fixed value, a control function, or a segment of program code in an actual implementation.

The information structure further comprises address information corresponding to data of each specific control information (e.g., offset address information). When the controller 215 reads the specific information from the non-volatile storage element 210 according to the specific type information and the specific identification information, the actual access address can be derived from corresponding offset address information and I/O base address, and then the specific control information can be read correctly.

Furthermore, in a practical implementation, an information structure, such as the information structure stored in the controller 215, further records an enabling bit corresponding to a section. The enabling bit is for marking whether or not the corresponding section in the non-volatile storage element 210 contains data. For example, when an enabling bit is enabled, for example, marked as "1" in logic, it implies that a control information set is stored in the corresponding section; and when the enabling bit is disabled, for example, marked as "0" in logic, it implies that no control information set is stored in the corresponding section. Therefore, the controller 215 can check each mark to confirm an existence of a control information set in each corresponding section. In this embodiment, the controller 215 only applies parsing to control information sets in a specific section when the specific section does have a control information set stored therein, which effectively enhances the parsing efficiency. Please note that the embodiment is not a limitation of the invention. In addition, an information structure, such as the information structure stored in the controller 215, also records a tag corresponding to each section. The tag is for marking a format of type information stored in the corresponding section in the non-volatile storage element 210. Specifically, the tag can be viewed as an index of the section to facilitate a quick and efficient comprehension of information stored in the section. Since the controller 215 reads control information in the non-volatile storage element 210 according to type information and identification information after completing the parsing operation, control information sets of a specific type control setting in the non-volatile storage element 210 can be stored in a different section. For example, in an alternative design, the section 301 shown in FIG. 3 can be modified to store control information sets of the property page setting, and the section 302 can be modified to be store control information sets of the general batch setting, which means that the order of sections are flexible and without fixed sequence.

Figure 4:
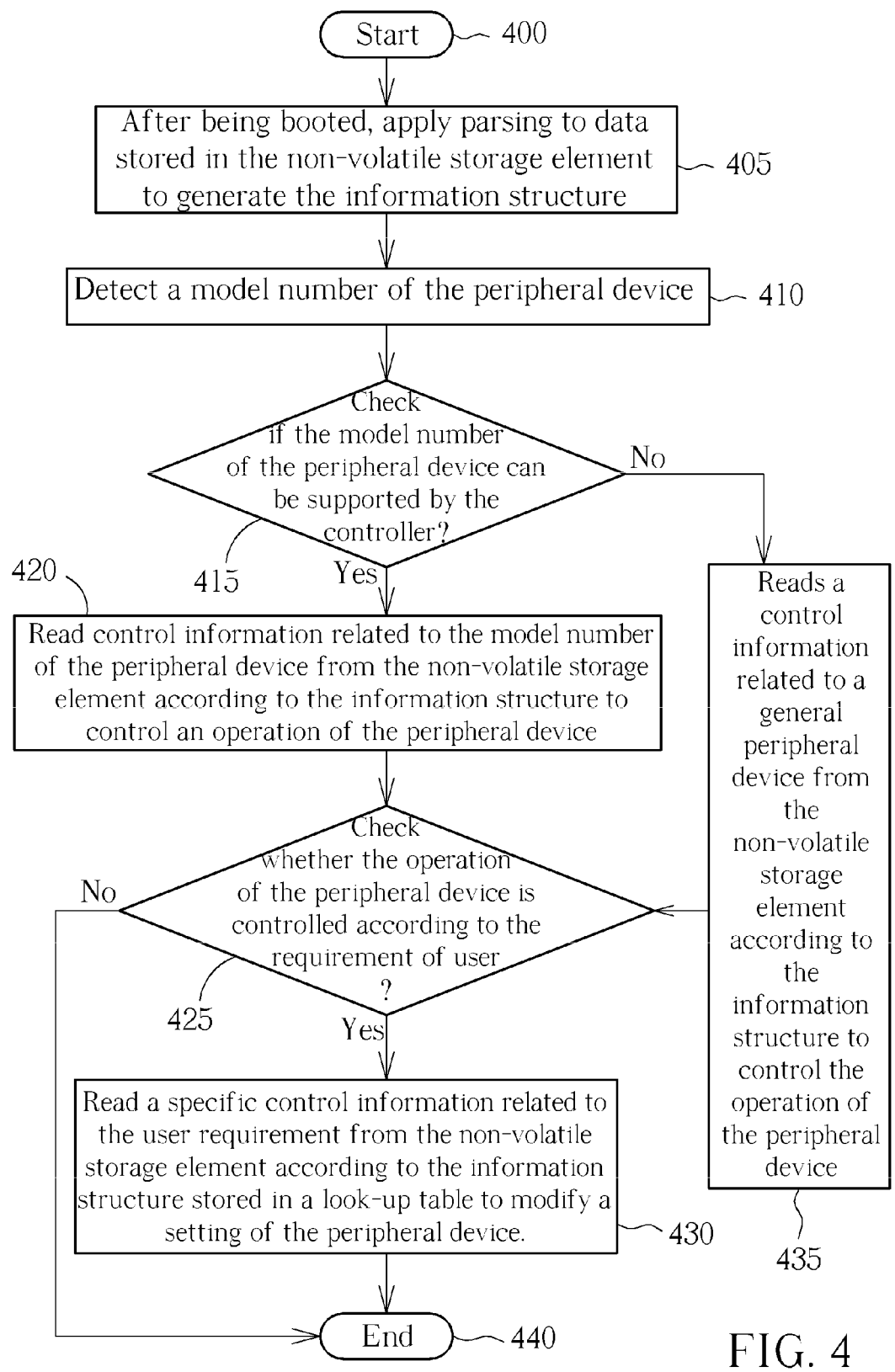
FIG. 4 is a flowchart illustrating an operation of the control apparatus shown in FIG. 2.

Please refer to FIG. 4. FIG. 4 is a flowchart illustrating an operation of the control apparatus 200 shown in FIG. 2. If the result is substantially the same, the steps are not required to be executed in the exact order shown in FIG. 4. In addition, the steps in FIG. 4 are not required to be executed sequentially, i.e., other steps can be inserted in between. The steps are detailed as follows:

Step 400: Start.

Step 405: After being booted, the controller 215 applies parsing to data stored in the non-volatile storage element 210 to generate the information structure.

Step 410: The controller 215 automatically detects a model number of the peripheral device 205.

Step 415: Check if the model number of the peripheral device 205 can be supported by the controller 200 (i.e., whether the information structure comprises control information related to the model number of the peripheral device 205)? If yes, go to step 420; otherwise, go to step 435.

Step 420: The controller 215 reads control information related to the model number of the peripheral device 205 from the non-volatile storage element 210 according to the information structure to control an operation of the peripheral device 205.

Step 425: Check whether the operation of the peripheral device 205 is controlled according to the requirement of user? If yes, go to step 430; otherwise, go to step 440.

Step 430: The controller 215 reads specific control information related to the user requirement from the non-volatile storage element 210 according to the information structure stored in a look-up table to modify a setting of the peripheral device 205.

Step 435: When the model number of the peripheral device 205 cannot be supported by the controller 300 (i.e., the control apparatus does not have or initially be set with control information related to the model number of the peripheral device 205), the controller 215 reads control information related to a general peripheral device from the non-volatile storage element 210 according to the information structure to control the operation of the peripheral device 205. Then, go to step 425.

Step 440: End.

In step 425, when the peripheral device 205 is a video sensor, and the user requirement, for example, is to alter the output resolution (e.g., from 640×480 to 1280×1024), image output format (e.g., from YUY2 to MJPEG), brightness, contrast, color, Gamma, etc, the controller will receive a control signal corresponding to the user requirement, and execute the segment of program code read from the read-only storage element 2151 to read control information corresponding to the user requirement according to the control signal and the information structure. In this way, the user can alter settings of the peripheral device 205 to control its operation.

In summary, an advantage of embodiments of the present invention is that through flexible programming of the non-volatile storage element 210, programming designers can easily alter control information or segments of program codes in the non-volatile storage element 210 according different customer requirements without a need for an extra design of a different controller. Therefore, the combination of the controller 215 and the non-volatile storage element 210 can effectively support different kinds of peripheral devices.

Those skilled in the art will readily observe that numerous modifications and alterations of the device and method may be made while retaining the teachings of the invention.

What is claimed is:

1. A control apparatus for controlling at least one peripheral device, comprising:
   a non-volatile storage element, for storing at least one control information set of the peripheral device; and
   a controller, externally coupled to the nonvolatile storage element, comprising a read-only storage element which stores a segment of program code, and for executing the segment of program code to read at least part of the control information set from the non-volatile storage element to control an operation of the peripheral device;
   wherein the non-volatile storage element stores a plurality of control information sets of the peripheral device; the controller executes the segment of program code and further applies parsing to the plurality of control information stored in the non-volatile storage element to generate an information structure which has not been generated in the plurality of control information, and stores the information structure in a look-up table; and the controller reads the at least part of the control information from the non-volatile storage element according to the information structure stored in the look-up table, or update at least part of control information sets of the plurality of the control information sets stored in the non-volatile storage element according to the information structure stored in the look-up table.

2. The control apparatus of claim 1, wherein the non-volatile storage element respectively stores the plurality of control information sets in a plurality of sections, each control information set has a corresponding type information and further comprises different control information each having corresponding identification information, the information structure generated by the controller comprises at least one specific type information and at least one specific identification information, and the controller reads a specific control information of the control information set from the non-volatile storage element according to the specific type information and the specific identification information to control the peripheral device.

3. The control apparatus of claim 2, wherein the information structure further comprises address information corresponding to an address at which data of the specific control information are stored, and the controller reads the specific control information in the non-volatile storage element according to the specific type information, the specific identification information and the address information.

4. The control apparatus of claim 2, wherein the specific type information relates to a property page setting, and the specific control information comprises at least one of a default value, a maximum value, a minimum value, and a singly-adjustable step size.

5. The control apparatus of claim 2, wherein the controller is coupled to the peripheral device through a bus, one specific control information set of the plurality of control information sets stores a device descriptor information of the bus, and the controller selects at least part of the control information sets of the plurality of control information sets for updating according to the device descriptor information of the bus.

6. The control apparatus of claim 1, wherein the information structure comprises at least one enabling bit which marks whether a corresponding section in the non-volatile storage element contains data.

7. The control apparatus of claim 1, wherein the information structure comprises at least a tag which marks a format of information stored in a corresponding section of the non-volatile storage element.

8. A control method for controlling at least one peripheral device, comprising:
storing a plurality of control information sets of the peripheral device in a non-volatile storage element which is externally coupled to a controller;
storing a segment of program code in a read-only storage element; and
executing the segment of program code to read at least part of the control information set to control an operation of the peripheral device, and the step of executing the segment of program code comprises:
executing the segment of program code to apply parsing to the plurality of control information sets to generate an information structure which has not been generated in the plurality of control information and storing the information structure in a look-up table; and
reading the at least part of the control information set from the non-volatile storage element according to the information structure stored in the look-up table or updating at least part of control information sets of the plurality of the control information sets stored in the non-volatile storage element according to the information structure stored in the look-up table.

9. The control method of claim 8, wherein the plurality of control information sets are respectively stored in a plurality of sections in the non-volatile storage element, each control information set has corresponding type information and further comprises different control information each having corresponding identification information, the information generated by the controller comprises at least one specific type information and at least one specific identification information, and the step of reading the at least part of the control information set from the non-volatile storage element according to the information structure stored in the look-up table comprises:
reading specific control information of the control information set from the non-volatile storage element according to the specific type information to control the peripheral device.

10. The control method of claim 9, wherein the information structure further comprises address information corresponding to an address at which data of the specific control information are stored, and the step of reading the specific control information in the control information set comprises:
reading the specific control information from the non-volatile storage element according to the specific type information, the specific identification information and the address information.

11. The control method of claim 9, wherein the specific type information relates to a property page setting, and the specific control information comprises at least one of a default value, a maximum value, a minimum value, and a singly-adjustable step size.

12. The control method of claim 9, wherein the controller is coupled to the peripheral device through a bus, one specific control information set of the plurality of control information sets stores device descriptor information of the bus, and the control method further comprises:
selecting at least part of the control information sets of the plurality of control information sets for updating according to the device descriptor information of the bus.

13. The control method of claim 8, wherein the information structure comprises at least one enabling bit which marks whether a corresponding section in the non-volatile storage element contains data.

14. The control method of claim 8, wherein the information structure comprises at least a tag which marks a format of information stored in a corresponding section of the non-volatile storage element.

15. A non-volatile storage element, externally coupled to a controller, comprising:
a first section, for storing a first control information set; and
a second section, for storing a second control information set;
wherein each control information set has corresponding identification information and further comprises different control information each having corresponding identification information, and the controller reads specific control information of a control information set in the non-volatile storage element according to specific type information and specific identification information to control a peripheral device, the specific type information and specific identification information, which has not been generated in the control information set, is generated by parsing the control information set in the non-volatile storage element.

16. The non-volatile storage element of claim 15, wherein the specific type information relates to a property page setting, and the specific control information comprises at least one of a default value, a maximum value, a minimum value, and a singly-adjustable step size.

* * * * *